United States Patent
Dhayni

(10) Patent No.: US 9,413,580 B2
(45) Date of Patent: Aug. 9, 2016

(54) SYMBOL TIME OFFSET CORRECTION VIA INTERCARRIER INTERFERENCE DETECTION IN OFDM RECEIVER

(71) Applicant: ST-Ericsson SA, Plan-les-Ouates (CH)

(72) Inventor: Achraf Dhayni, Vallauris (FR)

(73) Assignee: ST-ERICSSON SA, Plan-les-Ouates (CH)

(*) Notice: Subject to any disclaimer, the term of this patent is extended or adjusted under 35 U.S.C. 154(b) by 0 days.

(21) Appl. No.: 14/427,816

(22) PCT Filed: Sep. 17, 2013

(86) PCT No.: PCT/EP2013/069205
§ 371 (c)(1),
(2) Date: Mar. 12, 2015

(87) PCT Pub. No.: WO2014/044651
PCT Pub. Date: Mar. 27, 2014

(65) Prior Publication Data
US 2015/0256379 A1    Sep. 10, 2015

(30) Foreign Application Priority Data

Sep. 24, 2012  (EP) .................................. 12306153
Jul. 5, 2013  (EP) .................................. 13175263

(51) Int. Cl.
*H04L 7/00*   (2006.01)
*H04L 27/26*  (2006.01)
*H04L 25/03*  (2006.01)

(52) U.S. Cl.
CPC ...... *H04L 27/2665* (2013.01); *H04L 25/03159* (2013.01); *H04L 27/2662* (2013.01);
(Continued)

(58) Field of Classification Search
CPC ............ H04L 27/2665; H04L 27/2662; H04L 27/2672; H04L 27/2675; H04L 27/2682; H04L 25/03159; H04L 2025/03414; H04L 25/08; H04B 7/0632; H04B 1/10; H04B 1/11; H04B 1/12; H04B 1/13; H04B 1/14; H04B 1/027; H04B 1/126
See application file for complete search history.

(56) References Cited

U.S. PATENT DOCUMENTS 6,459,679 B1 *  10/2002  Kim ...................... H04L 5/0048
                                                     370/208
2004/0190637 A1 *  9/2004  Maltsev .............. H04L 27/2657
                                                     375/260
(Continued)

OTHER PUBLICATIONS

Cheng, Qi et al., "Joint Blind Timing Synchronization and Channel Estimation for OFDM using Receiver Diversity," Conference Record of the 2002 Thirty-Sixth Asilomar Conference on Signals, Systems & Computers, Pacific Grove, California, Nov. 3-6, 2002, pp. 649-653 (vol. 1), ISBN: 978-0/7803-7576-5, DOI: 10.1109/ACSSC.2002.1197261.

(Continued)

*Primary Examiner* — Dac Ha
(74) *Attorney, Agent, or Firm* — Patent Portfolio Builders PLLC

(57) ABSTRACT

Receiver (RCV) adapted for compensating for Symbol Timing Offset when receiving OFDM symbols, over a communication channel (TC), comprising: means (REG, DFT, CMP) for detecting a first phase with no Inter-Symbol Interference, means (REG, DFT, CMP) for detecting a second phase with presence of Inter-Symbol Interference, means (REG, DFT, CMP) for compensating for said Symbol Timing Offset by estimating starting points of said received OFDM symbols as being one sample before the start of said second phase. The timing synchronization is achieved in frequency domain by monitoring amplitude variation of the demodulated subcarriers symbols, said variation being due to the presence of Inter Symbol Interference when the FFT window overlaps with the subsequent OFDM symbol.

15 Claims, 3 Drawing Sheets

(52) U.S. Cl.
CPC ........ H04L27/2672 (2013.01); H04L 27/2675 (2013.01); H04L 27/2682 (2013.01); *H04L 2025/03414* (2013.01)

(56) References Cited

U.S. PATENT DOCUMENTS

| | | | | |
|---|---|---|---|---|
| 2005/0105659 | A1* | 5/2005 | Sheu | H04L 27/2678 375/360 |
| 2011/0002403 | A1* | 1/2011 | Wilhelmsson | H04L 5/0007 375/260 |
| 2012/0134404 | A1* | 5/2012 | Strait | H04L 27/2663 375/226 |

OTHER PUBLICATIONS

Lawrence, Sean et al., "Common Magnitude Error Due to Phase Noise in OFDM Systems, "IEEE International Symposium on Personal Indoor and Mobile Radio Communications, Sep. 1, 2007, pp. 1-4, XP031168400, ISBN: 978-1-4244-1143-6.

International Search Report issued in corresponding International application No. PCT/EP2013/069205, date of mailing Jan. 14, 2014.

Extended European Search Report issued in corresponding European application No. 13 17 5263, date of completion of the search Jan. 8, 2014.

Cheng, Qi et al., "Joint Blind Timing Synchronization and Channel Estimation for OFDM using Receiver Diversity," Conference Record of the 2002 Thirty-Sixth Asilomar Conference on Signals, Systems & Computers, Pacific Grove, California, Nov. 3-6, 2002, pp. 649-653 (vol. 1), ISBN: 978-0-7803-7576-5, DOI: 10.1109/ACSSC.2002.1197261.

Minn, H., et al., "On Timing Offset Estimation for OFDM Systems," IEEE Communication Letter, IEEE Service Center, Piscataway, NJ, USA, vol. 4, No. 7, Jul. 1, 2000, pp. 242-244, XP011429790; ISSN: 1089-7798, DOI: 10.1109/4234.852929.

Lee, HuiKyu et al., "Frequency Domain Estimation and Time Domain Correction of CFO and STO Offsets in OFDM System," 2011 13th International Conference on Advanced Communication Technology, Feb. 13, 2011, pp. 428-431, XP032013103, ISBN: 978-1-4244-8830-8.

Lawrence, Sean et al., "Common Magnitude Error Due to Phase Noise in OFDM Systems,"IEEE International Symposium on Personal Indoor and Mobile Radio Communications, Sep. 1, 2007, pp. 1-4, XP031168400, ISBN: 378-1-4244-1143-6.

* cited by examiner

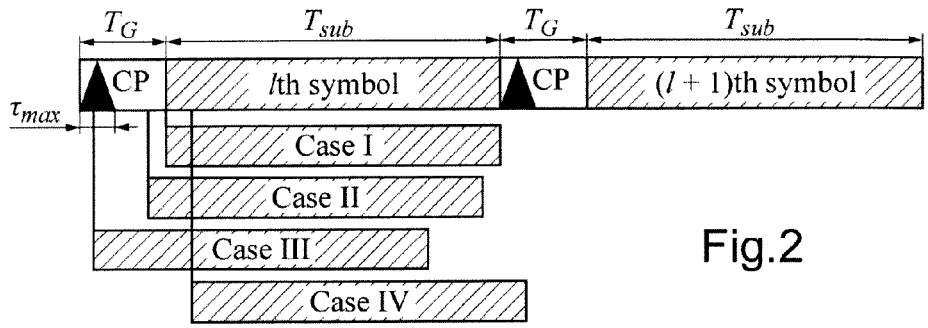
Fig.2
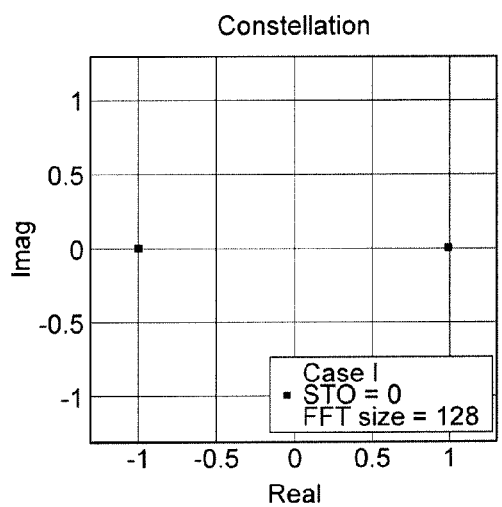
(a) Case I: $\delta = 0$    Fig.3a
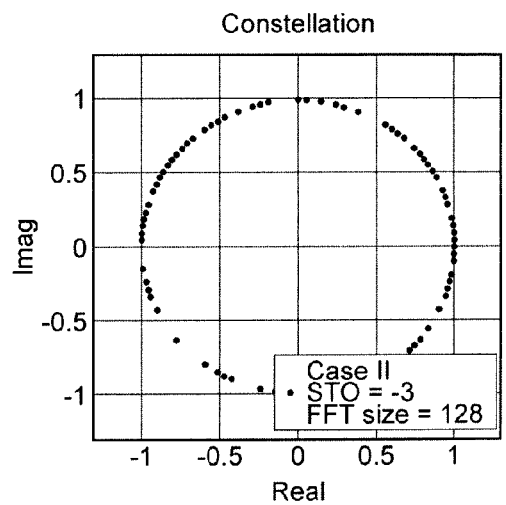
(b) Case II: $\delta = -3$    Fig.3b
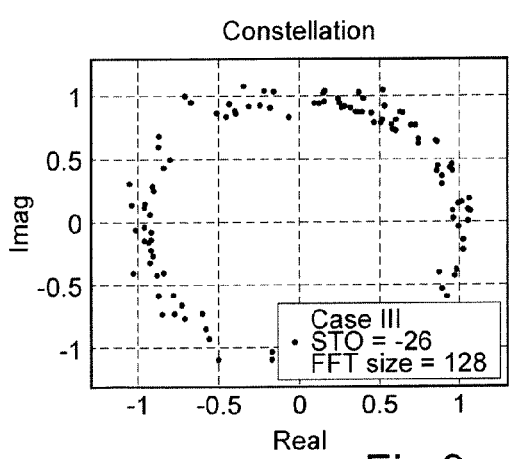
(c) Case III: $\delta = -26$    Fig.3c
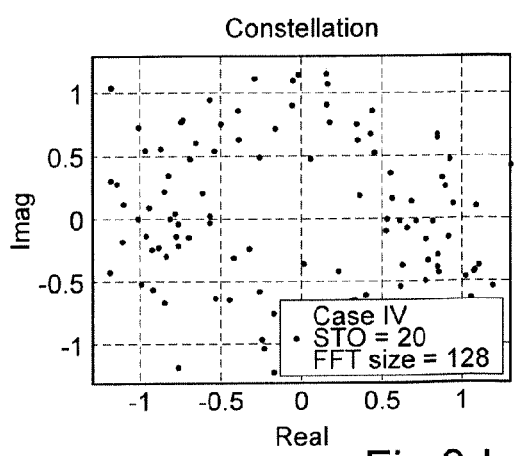
(d) Case IV: $\delta = 20$    Fig.3d

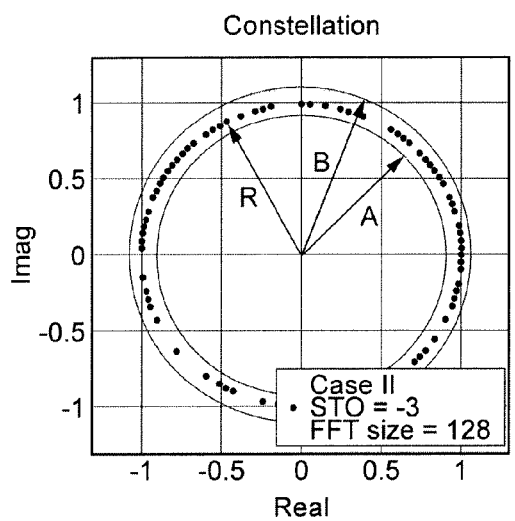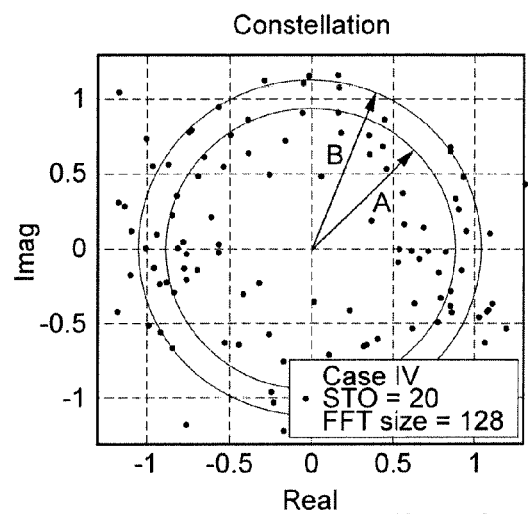
(a) Case II: $\delta = -3$    Fig.4a
(d) Case IV: $\delta = 20$    Fig.4b

SYMBOL TIME OFFSET CORRECTION VIA INTERCARRIER INTERFERENCE DETECTION IN OFDM RECEIVER

FIELD OF THE INVENTION

The invention relates to the field of multicarrier communications systems and more particularly to Orthogonal Frequency-Division Multiplexing (OFDM) systems, including wireless OFDM systems.

BACKGROUND OF THE INVENTION

Orthogonal Frequency-Division Multiplexing (OFDM), also referred to as "multicarrier modulation" (MCM) or "discrete multi-tone modulation" (DMTM), splits up and encodes high-speed incoming serial data, modulating it over a plurality of different carrier frequencies (called "subcarriers") within a communication channel to transmit the data from one user to another. The serial information is broken up into a plurality of sub-signals that are transmitted simultaneously over the subcarriers in parallel.

By spacing the subcarrier frequencies at intervals of the frequency of the symbols to transmit, the peak power of each modulated subcarrier lines up exactly with zero power components of the other modulated subcarriers, thereby providing orthogonality (independence and separability) of the individual subcarriers. This allows a good spectral efficiency (close to optimal) and minimal inter-channel interference (ICI), i.e. interferences between the subcarriers.

For all these reasons, OFDM is used in many applications. Many digital transmission systems have adopted OFDM as the modulation technique such as digital broadcasting terrestrial TV (DVB-T), digital audio broadcasting (DAB), terrestrial integrated services digital broadcasting (ISDB-T), digital subscriber line (xDSL), WLAN systems, e.g. based on the IEEE 802.11a/g standards, cable TV systems, etc.

However, the advantage of the OFDM can be useful only when the orthogonality is maintained. In case the orthogonality is not sufficiently warranted by any means, the performances of the OFDM system may be degraded due to inter-symbol interference (ISI) and inter-carrier interference (ICI).

This could happen as a result of synchronization issues between the clocks of the emitter and of the receiver of the OFDM system. These issues comprise:

Symbol Timing Offset (STO) and,
Carrier Frequency Offset (CFO).

Carrier Frequency Offset is notably caused by the mismatch of the oscillators of the emitter and of the receiver of the OFDM system, the nonlinear characteristic of the wireless channel and the Doppler shift when the emitter and/or the receiver are moving.

Even small frequency offsets can dramatically harm the signal to noise ratio (SNR) and the bit-error rate (BER). In particular, OFDM systems employing time-domain differential demodulation are very sensitive to CFO.

Therefore, accurate CFO estimation and correction algorithms should be implemented so as to avoid performance degradation.

Another issue that can arise is called Symbol Timing Offset (STO) corresponding to a lack of synchronization between the received symbols and the receiver's circuitry.

FFT (Fast Fourier Transform) and IFFT (Inverse Fast Fourier Transform) are the fundamental functions required for the modulation and demodulation at the transmitter and receiver of the OFDM systems. In order to take the N-point FFT in the receiver, it is required to get the exact samples of the transmitted signal for the OFDM symbol duration. A typical way to achieve this consists in performing a symbol-timing synchronization to detect the starting points of the OFDM symbols (with the cyclic prefixes removed).

This synchronization consists in an estimation of the STO (Symbol Timing Synchronization), and in a compensation based on this estimated STO.

The invention proposes a new method to estimate the STO, presenting a better accuracy that the methods according to the state of the art.

SUMMARY OF THE INVENTION

This is achieved with a method for compensating for Symbol Timing Offset when receiving OFDM symbols, over a communication channel, comprising:

detecting a first phase with no Inter-Symbol Interference, detecting a second phase with presence of Inter-Symbol Interference, compensating for said Symbol Timing Offset by estimating starting points of said received OFDM symbols as being one sample before the start of said second phase.

According to embodiments of the invention, the method may comprise one or several of the following features, taken alone or in partial or full combinations:

said first phase is detected when the constellation diagram corresponding to said OFDM symbols shows very low amplitude variation; and said second phase is detected when said constellation diagram shows more important amplitude variations;

said amplitude variations are considered as very low when within an interval depending on a noise level; and more important when outside of said interval.

said interval depends also on maximum estimations for Inter-Channel Interferences due to Carrier Frequency Offset and Sampling Frequency Offset;

said detecting phases consist in inputting said OFDM symbols into a register (REG) by shifting said register for each received OFDM symbol, and applying at each shift the content of said register to a time-to-frequency conversion module (DFT);

said time-to-frequency conversion module and said register are clocked N times faster than in normal operation;

said OFDM symbols are preamble symbols.

Another aspect of the invention relates to a computer program comprising program instructions and being loadable into a data processing unit and adapted to cause execution of the method previously described when the computer program is run by the data processing unit.

Another aspect of the invention relates to a receiver adapted for compensating for Symbol Timing Offset when receiving OFDM symbols, over a communication channel (TC), comprising:

means for detecting a first phase with no Inter-Symbol Interference, means for detecting a second phase with presence of Inter-Symbol Interference, means for compensating for said Symbol Timing Offset by estimating starting points of said received OFDM symbols as being one sample before the start of said second phase.

According to embodiments of the invention, the method may comprise one or several of the following features, taken alone or in partial or full combinations:

said first phase is detected by a computing module when the constellation diagram corresponding to said OFDM symbols shows very low amplitude variation; and said second phase is detected when said constellation diagram shows more important amplitude variations;

said computing module considers said amplitude variations as very low when within an interval depending on a noise level; and more important when outside of said interval;

said interval depends also on maximum estimations for Inter-Channel Interferences due to Carrier Frequency Offset and Sampling Frequency Offset;

said detecting phases consist in inputting said OFDM symbols into a register by shifting said register for each received OFDM symbol, applying at each shift the content of said register to a time-to-frequency conversion module;

said time-to-frequency conversion module and said register are clocked N times faster than in normal operation;

said OFDM symbols are preamble symbols.

Further features and advantages will appear from the following description of some embodiments of the invention, given as non-limiting examples, with reference to the accompanying drawings listed hereunder.

BRIEF DESCRIPTION OF THE DRAWINGS

FIG. 2 shows the impact of the STO in the frequency domain

FIGS. 3a, 3b, 3c and 3d show the received symbols in the signal constellation in some situations.

FIGS. 4a and 4b show the constellation in two situations.

DETAILED DESCRIPTION OF EMBODIMENTS OF THE INVENTION

Figure 1:
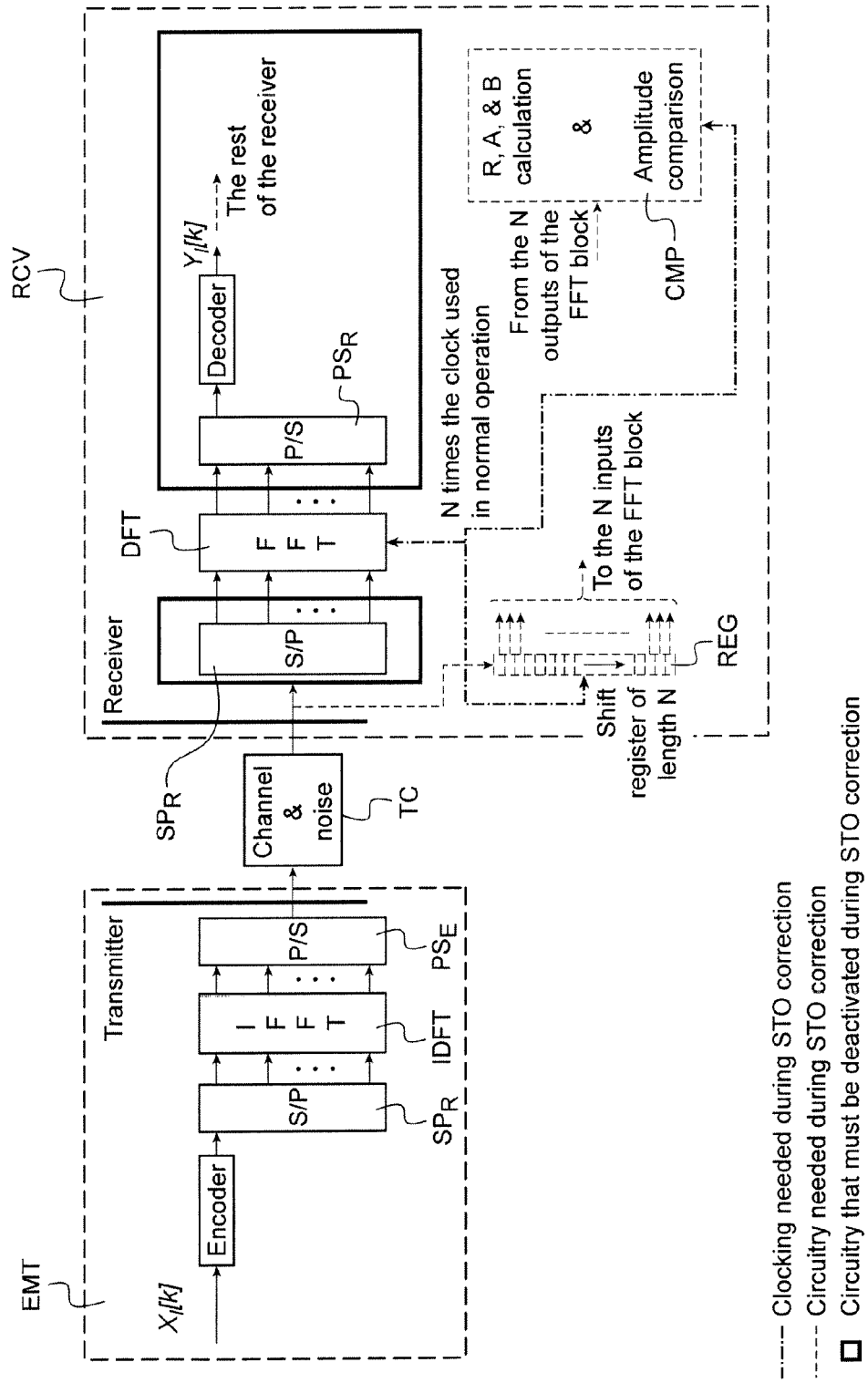
FIG. 1 illustrates a simplified and high-level block diagram of an OFDM system

FIG. 1 illustrates a simplified and high-level block diagram of an OFDM system comprising an emitter EMT and a receiver RCV connected by a communication channel TC. This communication channel is usually (but not necessarily) wireless and perturbed by noise.

The principle of this OFDM system consists in transmitting several symbols (or signal) in parallel by assigning to each of them a different carrier, each carrier being orthogonal to the others. The number of carriers (or subcarriers) depends on the total bandwidth and on the duration of a symbol (i.e. the size of the time window in which the receiver can capture the transmitted symbols).

The symbols to be transmitted, initially in the frequency domain, are transposed into the time domain and modulated for transmission over the communication channel TC. The receiver RCV transposes the received signals back to the frequency domain to extract the transmitted symbols.

More precisely, the symbols $X_l[k]$ to be transmitted at emitter EMT side are first appropriately encoded and then sent to a serial-to-parallel transformer $SP_E$. This function blocks aims in extracting from a symbol, a number N of individual values $X_l[k]$, where "k" ranges from 1 to N−1 and "l" represents the ordinal number of the OFDM symbol to be transmitted.

This number N is equal to the number of subcarriers used for the transmission over the communication channel TC. It depends on the standard. For instance according to WLAN 802.11a, 52 subcarriers are used (48 data subcarriers+4 pilot subcarriers), and 12 (6 on the "left" and 6 on the "right") subcarriers are not used (zero subcarriers).

Here and in the following descriptions, the variable k will be used for the frequency domain and the variable n for time domain.

The symbols $X_l[k]$ which are outputted by the serial-to-parallel transformer $SP_E$ are provided to a frequency-to-time conversion module IDFT. This frequency-to-time convertor can perform an inverse discrete Fourier Transform of the symbols $X_l[k]$ to generate symbols $x_l[n]$ in the time domain. It is often implemented by an inverse Fast Fourier Transform (I-FFT).

These symbols $x_l[n]$ are then multiplexed by the parallel-to-serial transformer $PS_E$ to produce a signal transmitted over the transmitted channel TC.

The transmitted channel can be associated with a transfer function $h_l(n)/H_l(k)$. It represents the channel multipath behavior, delay, and complex attenuation. The transfer function may vary over time and is therefore indexed by the number of the transmitted symbol.

The multiplexer $PS_E$ modulates the orthogonal subcarriers by the symbols to be transmitted.

The transmitted OFDM symbol $x_l(n)$ signal spectrum is the sum in the frequency domain of the orthogonal subcarrier sinc functions that are superposed over each other. The individual symbols can be independently modulated by using different types of modulations techniques, like for instance QAM (Quadrature Amplitude Modulation) or PSK (Phase-Shift Keying).

The symbols $y_l(n)$ are received by the receiver RCV.

The receiver RCV comprises a receiving function module RFM which generates demodulated symbols Yl[k] from the received symbols stream yl[n]. The demodulated symbols can then be passed over to other circuitry of the receiver RCV (not depicted).

The receiving function module RFM may perform different steps which are usual in OFDM systems but may be subject to variations and different implementations.

The high-level schema of the FIG. 1 shows a possible implementation where the receiving function module RFM comprises:

a serial-to-parallel transformer or demultiplexer $SP_R$, which parallelizes the received symbol to a set of time symbols $\{y_l(n)\}$.

A time-to-frequency conversion module DFT. This convertor can perform a discrete Fourier Transform of the time symbols $\{y_l(n)\}$ to generate a set of received frequency bins $\{Y_l(k)\}$ in the frequency domain, corresponding to determined subcarriers.

A parallel-to-serial transformer $PS_R$ to produce symbols $Y_l(k)$ made of these received frequency bins $\{Y_l(k)\}$. These symbols can then be transmitted to other circuitries of the receiver RCV (not depicted in the figure).

In order to perform these steps, the receiving function module RFM shares with the emitter EMT the same subcarriers frequencies, as well as the number of subcarriers N. They could have been communicated beforehand, or they may be set or tuned previously in both the emitter and receiver, for instance according to standards specifications.

However, the received symbols may have been perturbed during the transmission over the transmission channel TC. They can be received with potential CFO and STO. No information can be determined by the receiver RCV about the nature of the transmission channel to help valuing the STO. In other words, at the moment of STO estimation, we do not have information about the transfer function of the channel. Therefore, the receiver RCV should rely on blind determination techniques to compensate for the effects of the Symbol Time Offset (STO).

The received symbols can be expressed with the typical following equation:

$$y_l[n] = \frac{1}{N}\sum_{k=0}^{N-1} H_l[k]X_l[k]e^{j2\pi(k+\varepsilon)(n+\delta/N)} + z_l[n]$$

Where:
n, k represent variable over the time and frequency domains respectively.
$H_l$ is the channel transfer function during the $l^{th}$ symbol.
N is the number of subcarriers (which depends on the standard that is used).
$z_l$ is the time domain additive noise of the channel during the transmission of the $l^{th}$ symbol.
k+ϵ corresponds to the frequency shifted by the normalized carrier frequency offset ϵ. ϵ is the carrier frequency offset normalized with respect to the inter-subcarrier frequency Δf. ϵ is unit-less but the CFO is in Herz. ϵ=Δf/f.
δ corresponds to the normalized STO (Symbol Time Offset). δ is normalized with respect to the symbol period. δ is unit-less, but the STO is in seconds: δ=STO/symbol period.

In an ideal case, the receiver RCV would receive the $l^{th}$ symbol $y_l(n)$ such that its subcarriers are exactly located at the same frequency bin as the subcarriers of the $l^{th}$ transmitted symbol $x_l(n)$.

In an embodiment based on the WLAN 802.11a/g standard, the frequency bins are spaced by a Δf=312.5 kHz frequency. There are located at the following frequency values: −26*Δf, −25*Δf, −24*Δf, . . . 25*Δf, 26*Δf.

However, a CFOs can appear, because of the transmission channel Doppler shift, and/or of a frequency error between emitter EMT and receiver RCV up-conversion and down-conversion frequencies. The receiver then receives the symbols $y_l(n)$ shifted by ϵ in the frequency domain (therefore, it the previous equation, k is replaced by k+ϵ).

Regarding the symbol Time Offset (STO), its correction or its estimation and compensation have to be done before channel estimation and compensation and before CFO and SFO estimation and compensation. For this reason, it is important for a good solution to be immune to channel, SFO, and CFO effects. It will be seen later that the solution according to the invention is indeed immune to channel effect, SFO and CFO effects.

FIG. 2 shows the impact of the Symbol Time Offset (STO) in the frequency domain.

Depending on the location of the estimated starting point of OFDM symbol, the effect of the STO can be different. FIG. 2 shows four different cases of timing offset, in which the estimated starting point is exact (case I), a little earlier (case II), more earlier (case III), or a little later than the exact timing instance (case IV).

Here, we assume that the multi-path delay spread incurs the lagged channel response of $\tau_{max}$. In the current analysis, the effects of the noise and channel are ignored.

Case I (δ=0): This is the case when the estimated starting point of OFDM symbol coincides with the exact timing, preserving the orthogonality among subcarrier frequency components. In this case, the OFDM symbol can be perfectly recovered without any type of interference.

Case II (δ=−3): This is the case when the estimated starting point of OFDM symbol is before the exact point, yet after the end of the (lagged) channel response to the previous OFDM symbol. In this case, the $l^{th}$ symbol is not overlapped with the previous $(l−1)^{th}$ OFDM symbol, that is, without incurring any ISI (Inter-Symbol Interference) by the previous symbol in this case.

In this case, the orthogonality among subcarrier frequency components can be completely preserved. However, there exists a phase offset that is proportional to the STO δ and subcarrier index k, forcing the signal constellation to be rotated around the origin.

FIGS. 3a and 3b show the received symbols in the signal constellation for Case I and Case II, respectively. As expected, the phase offset due to STO is observed in Case II.

In the case II, the phase offset can be compensated by a single tap frequency-domain equalizer.

Case III (δ=−26): This is the case when the starting point of the OFDM symbol is estimated to exist prior to the end of the (lagged) channel response to the previous OFDM symbol, and thus, the symbol timing is too early to avoid the ISI (Inter-Symbol Interference). In this case, the orthogonality among subcarrier components is destroyed by the ISI (from the previous symbol) and furthermore, ICI (Inter-Channel Interference) occurs.

Case IV (δ=+20): This is the case when the estimated starting point of the OFDM symbol is after the exact point, which means the symbol timing is a little later than the exact one. In this case, the signal within the FFT interval consists of a part of the current OFDM symbol and a part of next one. Again, we face ISI (Inter-Symbol Interference) that leads to ICI (Inter-Channel Interference).

FIGS. 3c and 3d show the signal constellation for Case III and Case IV, respectively. We can note that the distortion (including the phase offset) in Case IV is too severe.

The invention is based on the fact that the ideal situation of case I happens between Case II and Case IV respectively.

Then a process can be defined:
Step 1: After start up, the receiver waits until it detects a first phase corresponding to Case II, where there is no ISI (Inter-Symbol Interference).
Step 2: Once Case II is detected, the receiver waits till it starts detecting a second phase corresponding to case IV and where there is ICI (Inter-Symbol Interferences).
Step 3: Once Case IV is detected, the receiver knows that Case I is located at the end of Case II (just before the detection of Case IV). Case I is located means that the receiver know where it must start receiving the OFDM symbol without any STO.

This is straightforward when looking at FIG. 1. In other words, as it will be seen more clearly later, the possible starting points are scanned and step 2 consists in detecting that one has gone one step too far by entering into the second phase, and that the best estimation is between the first and second phases (i.e. case II and case IV).

According to an embodiment of the invention, the step 1 can be implemented thanks to a register REG and by entering a special mode of operation of the receiver RCV.

In particular, instead of applying each N received symbols to the input of the time-to-frequency conversion module DFT, the received symbols bypass the $SP_R$ block and enters a register REG of length N, where they are applied serially to the N inputs of the DFT module.

A time to frequency conversion is thus computed for each newly received symbol. According to an embodiment of the invention, only preamble symbols are considered. In an implementation based on IEEE 802.11a/g standard, these preamble symbols correspond to the Training Field, e.g. L-STF (Legacy Short Training Field) and L-LTF (Legacy Long Training Field).

For that purpose the register REG and the DFT module must be clocked at frequency N times faster than the one applied to the DFT in normal operation.

Therefore, at each new received L-STF or L-LTF symbol (Legacy Short/Long Training Field), the register makes one shift, the new received symbol enters the register, and the time-to-frequency conversion is calculated.

In this special mode of operation, an embodiment of the invention may consist in applying the outputs of the time-to-frequency conversion module DFT to a computing module CMP.

This computing module aims in
   detecting these phases from the received symbols in the frequency domains, and in
   estimating starting points of the received OFDM symbols according the detected phases.

In this way, at each new received symbol and shift of the register REG, the new configuration is tested as a possible starting point. All the possible starting points are thus scanned, and the right one can be determined.

The detection of phases can be performed by making use of constellation diagrams. FIGS. 4a and 4b shows constellation diagrams corresponding to the case II ($\delta=-3$) and to the case IV ($\delta=20$) respectively.

They show that the cases II and IV can be detected by detecting amplitude variations: the phase corresponding to case II shows very low amplitude variation, if any (corresponding to no ICI), whereas the phase corresponding to case IV shows more important amplitude variations.

The separation between the two phases can be done according to different methods, e.g. by establishing a threshold. This threshold can itself be determined in different ways, for instance by tests, simulation or experiments.

According to an embodiment of the invention, the separation between the two phases on the constellation diagram depends on noise level.

According to an embodiment of the invention, the separation depends also on maximum estimations for Inter-Channel Interferences (ICI) due to Carrier Frequency Offset (CFO) and Sampling Frequency Offset (SFO).

According to the embodiment depicted on FIGS. 4a and 4, the phases can be detected according to whether the received samples are within or out of the zone between circles A and B. The first phase (case II) corresponds to the zone between circles A and B, and the second phase (case IV) to the zone outside.

Accordingly, the receiver detects first that all received samples (that, for instance, correspond to BPSK transmitted samples of the preamble) have a very low amplitude variation. Because in Case II, the samples are all on the same circle as in FIG. 4a, it knows that it is in the Case II phase.

Once Case II is detected, the amplitude R of the received samples is detected and A and B values are calculated such that it is guaranteed that R⊡[A, B]. In the embodiment depicted in FIG. 1, the values A, B and R are calculated by the computing module CMP.

According to this embodiment, when the receiver is in the case II, it keeps detecting samples with amplitudes between A and B until it starts detecting amplitudes out of the interval [A, B]. At the moment of the $1^{st}$ sample that violates the interval [A, B], the receiver knows that the Case II phase has finished and that Case IV phase has just started. One sample before this $1^{st}$ sample, the starting point (start-of-frame) of the OFDM symbols is chosen by the receiver. The Symbol Timing Offset can thus be compensated.

One of the advantages of this embodiment of the invention is to be totally immune to some potential problems, namely channel effect, CFO and SFO.

Regarding channel effect first, because the channel is constant all over the OFDM symbol, the impacts of the channel effect will only modify the radius R (amplitude of the received samples in Case II) of the circle depicted on FIG. 4a. For this reason, it is interesting to calculate the amplitude values A and B according to the detected value of R, according to the following equation:

$$A = R - 6 \cdot N_{rms}$$

$$B = R + 6 \cdot N_{rms}$$

where $N_{rms}$ is the noise RMS (root-mean-square) level of the amplitude of the complex signals of the points at radius R.

Other criteria exist to calculate the values of A and B, but this is beyond the scope of the invention which does not depend on a particular method to compute the values A and B.

Furthermore, the invention is also immune to CFO (Carrier Frequency Offset) and SFO (Sampling Frequency Offset).

As it is well known, the CFO and SFO impact the phase of the received samples. But the technique previously described is amplitude-based. Therefore, it is not impacted by the presence of CFO and/or SFO.

The CFO and SFO cause also ICI (Inter Channel Interference): that means that the received samples are not aligned anymore on a circle circumference as we have shown so far in FIGS. 3a and 3b. The samples can be, however, a little bit spread around the circumference. This can be taken into account by considering a larger interval [A, B], where A and B become as follows:

$$A = R - 6N_{rms} - \max CFO+SFO\ ICI\ \text{amplitude error}$$

$$B = R + 6N_{rms} + \max CFO+SFO\ ICI\ \text{amplitude error}$$

Where max CFO+SFO ICI amplitude error is the absolute value of the following equation:

$$e^{j\pi\varepsilon_f(N-1)/N} \sum_{m=0, m\neq k}^{N-1} \frac{\sin(\pi(m-k+\varepsilon_f))}{N\sin(\pi(m-k+\varepsilon_f)/N)} H[m]X_l[m]e^{j\pi(m-k)(N-1)/N}$$

According to an embodiment of the invention, it is not necessary to estimate "max CFO+SFO ICI amplitude error" at each preamble; a worst-case situation can been considered, and accordingly, the worst-case "max CFO+SFO ICI amplitude error" is calculated and stored on-chip. This embodiment allows to save computing resource at receiver end.

The invention has been described with reference to preferred embodiments; but other embodiments and variations are possible while being within the scope of the claimed invention.

The invention claimed is:

1. Method for compensating for Symbol Timing Offset when receiving OFDM symbols, over a communication channel, comprising:
   detecting a first phase with no Inter-Symbol Interference,
   detecting a second phase with presence of Inter-Symbol Interference, and
   compensating for said Symbol Timing Offset by estimating starting points of said received OFDM symbols as being one sample before the start of said second phase.

2. Method according to claim 1, wherein said first phase is detected when the constellation diagram corresponding to said OFDM symbols shows very low amplitude variation; and said second phase is detected when said constellation diagram shows more important amplitude variations.

3. Method according to claim 2, wherein said amplitude variations are considered as very low when within an interval depending on a noise level; and more important when outside of said interval.

4. Method according to claim 3, wherein said interval depends also on maximum estimations for Inter-Channel Interferences due to Carrier Frequency Offset and Sampling Frequency Offset.

5. Method according to claim 1, wherein said detecting phases consist in inputting said OFDM symbols into a register by shifting said register for each received OFDM symbol, and applying at each shift the content of said register to a time-to-frequency conversion module.

6. Method according to claim 5, wherein said time-to-frequency conversion module and said register are clocked N times faster than in normal operation.

7. Method according to claim 1, wherein said OFDM symbols are preamble symbols.

8. A non-transitory computer-readable medium comprising a computer program comprising program instructions, which when loaded into a data processing unit to cause execution of a method for compensating for Symbol Timing Offset when receiving OFDM symbols, over a communication channel, comprising:
   detecting a first phase with no Inter-Symbol Interference,
   detecting a second phase with presence of Inter-Symbol Interference, and
   compensating for said Symbol Timing Offset by estimating starting points of said received OFDM symbols as being one sample before the start of said second phase.

9. A receiver adapted for compensating for Symbol Timing Offset when receiving OFDM symbols, over a communication channel, comprising:
   means for detecting a first phase with no Inter-Symbol Interference,
   means for detecting a second phase with presence of Inter-Symbol Interference,
   means for compensating for said Symbol Timing Offset by estimating starting points of said received OFDM symbols as being one sample before the start of said second phase.

10. A receiver according to claim 9, wherein said first phase is detected by a computing module when the constellation diagram corresponding to said OFDM symbols shows very low amplitude variation; and said second phase is detected when said constellation diagram shows more important amplitude variations.

11. A receiver according to claim 10, wherein said computing module considers said amplitude variations as very low when within an interval depending on a noise level; and more important when outside of said interval.

12. A receiver according to claim 11, wherein said interval depends also on maximum estimations for Inter-Channel Interferences due to Carrier Frequency Offset and Sampling Frequency Offset.

13. A receiver according to claim 9, wherein said detecting phases consist in inputting said OFDM symbols into a register by shifting said register for each received OFDM symbol, applying at each shift the content of said register to a time-to-frequency conversion module.

14. A receiver according to claim 13, wherein said time-to-frequency conversion module and said register are clocked N times faster than in normal operation.

15. A receiver according to claim 9, wherein said OFDM symbols are preamble symbols.

* * * * *